United States Patent
Hambitzer

(10) Patent No.: US 11,811,014 B2
(45) Date of Patent: Nov. 7, 2023

(54) SOLID IONIC CONDUCTOR FOR RECHARGEABLE ELECTROCHEMICAL BATTERY CELLS

(71) Applicant: High Performance Battery Technology GmbH, Bonn (DE)

(72) Inventor: Günther Hambitzer, Bonn (DE)

(73) Assignee: High Performance Battery Technology GmbH, Bonn (DE)

(*) Notice: Subject to any disclaimer, the term of this patent is extended or adjusted under 35 U.S.C. 154(b) by 707 days.

(21) Appl. No.: 16/976,181

(22) PCT Filed: Dec. 20, 2018

(86) PCT No.: PCT/EP2018/086327
§ 371 (c)(1),
(2) Date: Aug. 27, 2020

(87) PCT Pub. No.: WO2019/170274
PCT Pub. Date: Sep. 21, 2019

(65) Prior Publication Data
US 2020/0411903 A1    Dec. 31, 2020

(30) Foreign Application Priority Data
Mar. 7, 2018    (DE) .................. 102018105271.5

(51) Int. Cl.
*H01M 10/0562*    (2010.01)
*H01M 10/0525*    (2010.01)
*C01F 7/786*    (2022.01)
*C01F 7/68*    (2006.01)
*H01M 10/052*    (2010.01)
(Continued)

(52) U.S. Cl.
CPC ......... *H01M 10/0562* (2013.01); *C01F 7/786* (2022.01); *H01M 10/0525* (2013.01); *C01B 19/002* (2013.01); *C01F 7/68* (2013.01); *C01G 15/006* (2013.01); *C01P 2006/40* (2013.01); *H01M 10/052* (2013.01);
(Continued)

(58) Field of Classification Search
CPC .......... C01B 19/002; C01F 7/68; C01F 7/786; C01G 15/006; C01P 2006/40; H01M 10/052; H01M 10/0525; H01M 10/0562; H01M 10/058; H01M 2300/0068; Y02E 60/10; Y02P 70/50
See application file for complete search history.

(56) References Cited

U.S. PATENT DOCUMENTS 4,362,794 A * 12/1982 Abraham ............. C01G 15/006
429/345

FOREIGN PATENT DOCUMENTS

DE     102016106947 A1    10/2017
WO     2017178543 A1    10/2017

* cited by examiner

*Primary Examiner* — Lingwen R Zeng
(74) *Attorney, Agent, or Firm* — Occhiuti & Rohlicek LLP

(57) ABSTRACT

The invention relates to a solid ionic conductor for a rechargeable non-aqueous electrochemical battery cell having the stoichiometric formula $K(ASXX')_p \times q\, SO_2$, where K represents a cation from the group of the alkali metals with p=1, of the alkaline-earth metals with p=2 or of the zinc group with p=2, A represents an element from the third main group, S represents sulfur, selenium or tellurium, X and X' represent a halogen, and the numerical value q is greater than 0 and less than or equal to 100.

16 Claims, 1 Drawing Sheet

(51) Int. Cl.
*C01B 19/00* (2006.01)
*C01G 15/00* (2006.01)
*H01M 10/058* (2010.01)

(52) U.S. Cl.
CPC ............... *H01M 10/058* (2013.01); *H01M 2300/0068* (2013.01); *Y02E 60/10* (2013.01); *Y02P 70/50* (2015.11)

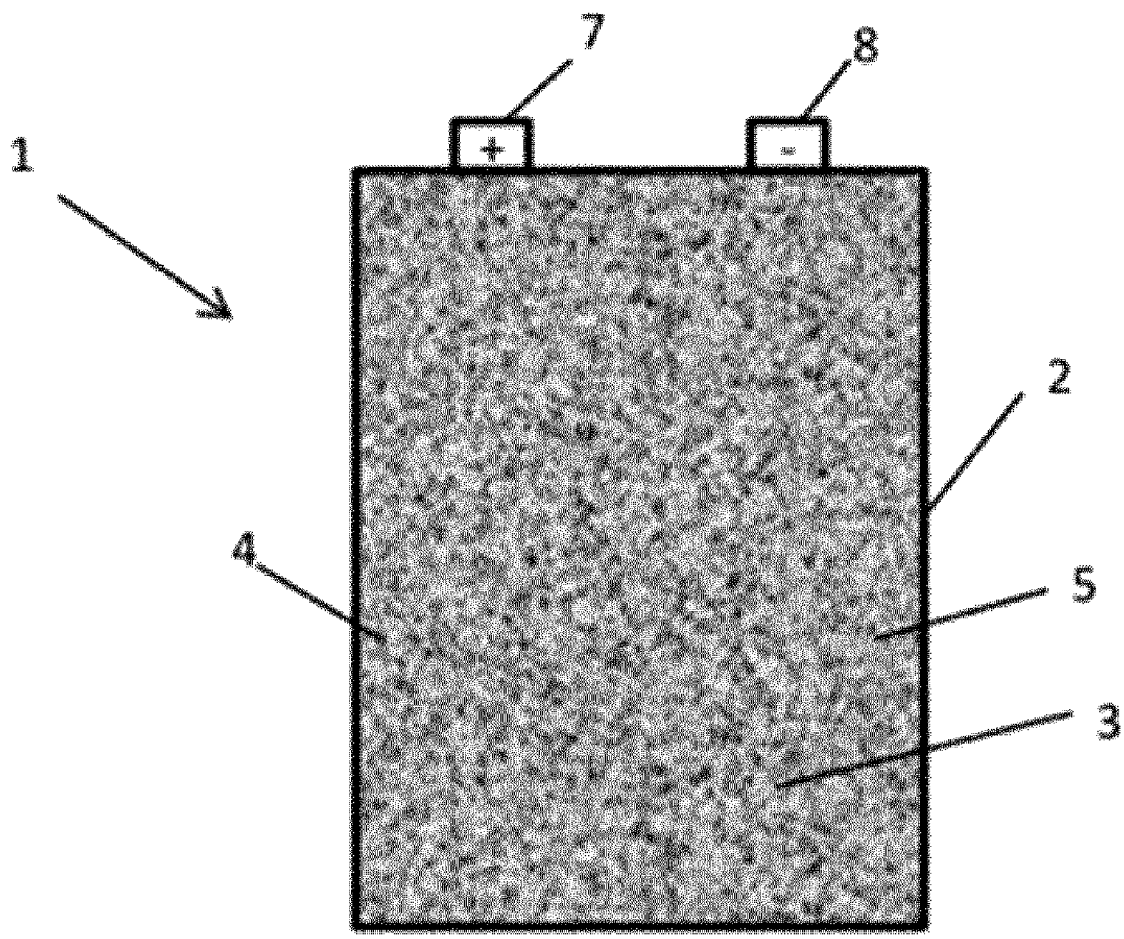

SOLID IONIC CONDUCTOR FOR RECHARGEABLE ELECTROCHEMICAL BATTERY CELLS

CROSS-REFERENCE TO RELATED APPLICATIONS

This application is a national phase under 35 U.S.C. 371 of International Application No. PCT/EP2018/086327 filed on Dec. 20, 2018, which claims priority to the German Application No. 102018105271.5 filed on Mar. 7, 2018, the contents of all of which are hereby incorporated by reference in their entities.

The invention relates to a solid ionic conductor for a non-aqueous rechargeable electrochemical battery cell with a positive and a negative electrode, and the battery constructed from at least one battery cell. In the literature, solid ionic conductors are also called solid electrolytes.

Rechargeable batteries are of great importance in many technical fields. They are often used for mobile applications, such as cell phones, notebooks, and electric vehicles.

In addition, there is a great need for batteries for stationary applications, such as grid stabilization, grid buffering, and decentralized energy supply.

There is a great need for improved rechargeable batteries that particularly meet the following requirements:
Safety through non-inflammability;
longevity, i.e., long calendrical lifespan;
long cycle lifespan, i.e., a very high number of usable charge and discharge cycles, even with high retrievable currents, i.e., at high power density;
high energy efficiency over the entire lifespan;
very good electrical performance data, especially high specific energy (Wh/kg), or
high energy density (Wh/l) at simultaneous high power density (W/l);
the lowest possible internal pressure in the cell at room temperature in order to be operable even at higher temperatures;
the lowest possible internal resistance, even at low temperatures, in order to ensure a high power density;
the lowest possible production costs, i.e., preferred use of cost-effective and readily available materials; and
low cost per kilowatt hour retrieved from the battery.

Rechargeable batteries, which contain liquid electrolytes containing sulfur dioxide, particularly for achieving non-inflammability, are known from WO 00/79631. Such batteries are also described, inter alia, in WO2015/067795 and WO2005031908, in which lithium cobalt oxide or lithium iron phosphate are proposed as the active metal. In particular, a liquid solvate ($LiAlCl_4 \times n\ SO_2$) formed from lithium tetrachloroaluminate ($LiAlCl_4$) and sulfur dioxide ($SO_2$) are used as the electrolyte, wherein, for the solvation number n=1.5, the vapor pressure of $SO_2$ lies below 0.1 bar and at n>=4.5, it lies above 2 bar. In this and the following stoichiometric formulas, the character × stands for a multiplication. The solvation number n is an element of the positive real numbers. Such $SO_2$-containing electrolytes can be produced in a conventional manner from lithium chloride, aluminum chloride, and sulfur dioxide. The associated production methods aim particularly at the dryness of the liquid electrolyte obtained, i.e., the electrolyte produced is supposed to contain as little water as possible in any form, including chemically converted water. This requires particularly complex processes for drying substances involved in the production, particularly the highly hygroscopic lithium chloride or mixtures or melts of lithium chloride and aluminum chloride.

In the literature (doctoral thesis Koslowski, Bernd-F.: "Radiographical and vibrational spectroscopic tests on solvates of the type MAlCl4/SO2 [MAICl-SO] (M=Li, Na) and their interactions with aromatics," (Hannover, Univ., school for mathematics and natural science, diss., 1980), liquid solvates of $LiAlCl_4$ and n $SO_2$ are described which, at a specific n and at a defined temperature, form crystals as solid solvates and are thus precipitated from the solution. One example is $LiAlCl_4 \times 3.0\ SO_2$, which can crystallize or melt again at about 29° C. However, with these solid solvates of lithium tetrachloroaluminate with sulfur dioxide, practically no ionic conductivity is detectable.

In a liquid $SO_2$-containing electrolyte of lithium tetrachloroaluminate and sulfur dioxide, electrode potentials are measured against metallic lithium (vs. $Li/Li^+$), which immerses in the liquid electrolyte.

As described in WO2017/178543 A1, with such battery cells with a liquid $SO_2$-containing electrolyte, a reduction of sulfur dioxide to lithium dithionite at potentials of less than or equal to 3V vs. $Li/Li^+$ takes place on the surface of a negative electrode, for example, on the surface of graphite. Such a cover layer made of lithium dithionite is stable up to the lithium precipitation. However, if the lithium dithionite of this layer is converted chemically, it will, due to the reduction of sulfur dioxide, immediately form again on the surface of the negative electrode as long as the potential of the negative electrode is less than approximately 3.0V vs. $Li/Li^+$.

This reaction of lithium dithionite, known as the self-discharge reaction, starts with the autodissociation of the anion of the dissolved conducting salt and then leads to the consumption of lithium ions, charge quantities, sulfur dioxide and tetrachloroaluminations. In order to ensure that sufficient liquid electrolyte is present in the battery cell over the lifespan of such a conventional battery cell, such a conventional battery is initially filled with a correspondingly large quantity of liquid electrolyte.

The self-discharge reaction described above has the effect that batteries that have been filled with $LiAlCl_4 \times n\ SO_2$ as the liquid electrolyte are subject to a very high capacity loss beginning with the first charging cycle. In such conventional batteries, more active positive mass than active negative mass, usually twice the quantity, is usually introduced during production due to said reaction and the associated consumption of lithium ions or charge quantity. The self-discharge reaction means that the capacity of such a conventional battery is almost halved in the first few cycles. For this reason, batteries of this type are frequently cycled, i.e., charged and discharged, before being placed on the market, so that the precycled batteries no longer have the large drop in capacity. The remaining capacity of such precycled batteries is then often defined as 100% or nominal capacity. In the further charging and discharging cycles, the capacity then drops over more than 50,000 cycles to a limit value of, e.g., 30% of the nominal capacity. Beginning with the first charging, the internal resistance of the battery increases only slightly during the entire cycling.

According to the knowledge of the inventor, the following total gross reaction takes place with the decrease in capacity:

$$6Li^+ + 6e^- + 1SO_2 + 2Li^+ + 2AlCl_4^- => Li^+ + AlSCl_2^- + LiAlO_2 + 6LiCl \qquad \text{(Eq. I)}$$

Over time, an equilibrium between the precipitating lithium aluminate ($LiAlO_2$) and the lithium oxodichloroaluminate (LiAlOCl₂), which was initially formed and dissolved in the electrolyte, and the lithium tetrachloroaluminate (LiAlCl₄) dissolved in the electrolyte, sets in:

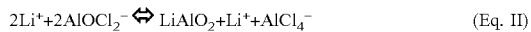

(Eq. II)

From the calculation of the decrease in capacity of the cycled batteries described above, it follows that the reaction continues until all tetrachloroaluminate ions (AlCl₄⁻) have been converted. According to (Eq. II), moderately soluble oxodichloroaluminates are no longer present after the tetrachloroaluminate ions have been consumed; instead, they have been completely converted into the insoluble lithium aluminate.

In order to keep the decrease in capacity due to the conversion of all tetrachloroaluminate ions relatively small, a sulfur dioxide-rich liquid electrolyte, e.g. LiAlCl₄×6 SO₂, is poured in which, at room temperature, has a correspondingly high vapor pressure of the sulfur dioxide of several bars.

Proceeding from these disadvantages of the prior art, the problem addressed by the invention is that of providing a solid ionic conductor as a solid electrolyte for a battery cell, which solves or at least reduces the problems described in connection with the prior art.

According to the invention, this problem is solved by the subject matter defined in the independent claims, wherein preferred embodiments are described in the dependent claims.

In the following, the invention shall be described in more detail with reference to the attached schematic drawing, which shows as FIG. 1 a schematic drawing of a rechargeable battery.

FIG. 1 shows a schematic drawing of a rechargeable battery 1 with a housing 2 and at least one battery cell 3, which has a positive electrode 4 and a negative electrode 5. Via a respective discharge element, the electrodes 4 and 5 are connected to connecting contacts 7 and 8 via electrode connections common in battery technology, via which the battery can be charged or discharged. Furthermore, the battery cell comprises at least the solid ionic conductor described below as the electrolyte.

A solid ionic conductor is a solid, in which at least one type of ion is so mobile that an electric current carried by these ions can flow. Solid ionic conductors are electrically conductive, but unlike metals, they have little or no electronic conductivity.

Surprisingly, it has been shown that some solid compounds containing sulfur dioxide, particularly the preferred sulfur dioxide-containing lithium thiodichloroaluminate (LiAlSCl₂×q SO₂), are good solid ionic conductors and have a high lithium ion conductivity comparable to the liquid SO₂-containing electrolytes. The SO2-containing solid ionic conductors have a low SO₂ pressure, a good bonding of the active components and a significantly lower release of sulfur dioxide or electrolyte components that react violently with moisture, for example, when opening battery cells, so that battery cells with such a solid ionic conductor are inherently safe.

Active positive masses can be of any type, preferably lithium metal oxides, such as LiCoO₂, LiNiFeCoO₂ or Li₃V₃O₈, or alternatively lithium metal phosphates, such as LiFePO₄, or alternatively lithium sulfide, i.e., Li₂S, can be used, wherein lithium sulfide is particularly preferred due to the high energy density. The active negative mass can also be of any type, preferably graphite, another type of carbon, lithium titanium oxide (Li₄Ti₅O₁₂, LTO) or silicon (Si) can be used.

In a first embodiment, the battery cell contains a solid ionic conductor with the stoichiometric formula [K(ASX₂)_p ×q SO₂]. In a second embodiment, the battery cell contains a solid ionic conductor with the stoichiometric formula [K(ASXX')_p×q SO₂]. In both embodiments, the abbreviation K represents a cation from the group of the alkali metals (particularly Li, Na, K, Rb, Cs) or the alkaline earth metals (particularly Be, Mg, Ca, Sr, Ba) or the zinc group (i.e., the twelfth group of the periodic table, particularly Zn, Cd, Hg). In the case that K is selected from the group of alkali metals, p=1. In the case that K is selected from the group of alkaline earth metals or from the zinc group, p=2. The abbreviation A represents an element from the third main group of the periodic table, particularly boron, aluminum, gallium, indium, or thallium. The abbreviation S represents sulfur, selenium, or tellurium, wherein the S in SO2 only represents sulfur. The numerical value q is an element of the positive real numbers. In both the first and the second embodiment of the solid ionic conductor, X (without apostrophe) represents a halogen, particularly fluorine, chlorine, bromine or iodine. The X' in the stoichiometric formula of the solid ionic conductor of the second embodiment also represents a halogen, particularly fluorine, chlorine, bromine or iodine, but it is a halogen different from the halogen X (without apostrophe), so that the solid ionic conductor of the second embodiment has a combination of two different halogens.

In both embodiments, it is preferred that K represents Li. In the first embodiment, it is particularly preferred that the solid ionic conductor has the stoichiometric formula LiAlSCl₂×q SO₂, i.e., the solid ionic conductor is preferably a solid lithium thiodichloroaluminate containing sulfur dioxide.

Without loss of generality, features of the solid ionic conductor shall be explained below using the first embodiment of the solid lithium thiodichloroaluminate containing sulfur dioxide, wherein the descriptions also apply to a solid ionic conductor according to the second embodiment.

Surprisingly, the solid ionic conductor absorbs sulfur dioxide and releases it again, so that the solid ionic conductor reversibly absorbs the sulfur dioxide. The solid lithium thiodichloroaluminate containing sulfur dioxide absorbs sulfur dioxide or releases sulfur dioxide on the basis of temperature and sulfur dioxide pressure until an equilibrium with a fixed sulfur dioxide value q has been reached, wherein q is dependent on pressure and temperature. According to the results of the inventor, the absorption and release of the SO₂ by the solid ionic conductor is thus reversible, wherein the sulfur dioxide value q in the solid ionic conductor can be set to any positive value. In contrast to the solid, non-ion-conducting solvates LiAlCl₄×n SO₂, the solid ionic conductor does not have a fixed n, such as 1.0; 1.5; 3.0, which precipitate as solids at the appropriate temperature. Instead, according to previous findings, the sulfur dioxide value q in solid LiAlSCl₂×q SO₂ can assume almost any values greater than 0 to q≈100 in a wide range.

In general, the sulfur dioxide value q of the solid ionic conductor increases with decreasing temperature and increasing SO₂ gas pressure. In addition to the solid phase of LiAlSCl₂×q SO₂, an ion-containing liquid and a gaseous SO₂ phase can also be present in the battery or battery cell during operation, wherein the ions can be, e.g., Li⁺ and AlSCl₂ ions. The liquid and the gaseous SO₂ phase, i.e., the sulfur dioxide not bonded in the solid ionic conductor, is thus a free SO₂.

At temperatures of −10° C., the sulfur dioxide vapor pressure above the liquid phase is approximately 1 bar. The solubility of the conducting salt LiAlSCl₂ decreases with decreasing temperature. Since a liquid phase is still present at a temperature of −30° C. in a reactor which contains approximately 0.05 mol of essentially precipitated solid LiAlSCl$_2$×q SO$_2$ in 5 mol of SO$_2$, the maximum sulfur dioxide value q can be estimated to be q≤100.

At 19° C. and approximately 3 to 4 bar SO$_2$ pressure, the battery cell or battery can thus contain the pure solid ionic conductor, LiAlSCl$_2$×~4 SO$_2$, wherein the symbol ~ here means approximately, and also an approximately 0.4 molar liquid solution of LiAlSC$_2$ and an SO$_2$ gas phase.

If the liquid phase is removed, an equilibrium sets in between the solid ionic conductor and the gaseous SO$_2$ with a sulfur dioxide value q which is fixed at a constant temperature. When the SO$_2$ pressure is reduced by removing gaseous SO$_2$, the sulfur dioxide value q in the solid ionic conductor is also reduced. Since the diffusion of the sulfur dioxide in the solid ionic conductor is relatively slow, the establishment of a stable equilibrium, depending on the layer thickness of the solid ionic conductor, requires a few minutes to several days. It was measured that at 19° C. and 3.1 bar SO$_2$ gas pressure (i.e., 2.1 bar above normal pressure), the sulfur dioxide value q=3.2 is established in the solid ionic conductor. Therefore, the solid ionic conductor then has the formula LiAlSCl$_2$×3.2 SO$_2$. If the SO$_2$ pressure in the gas phase is reduced to 2.5 bar, a solid ionic conductor with the formula LiAlSCl$_2$×2.1 SO$_2$ is present at 19° C. A further removal of gaseous SO$_2$ down to the pressure of 1.3 bar at 19° C. results in a reduction of the sulfur dioxide value to 1.7, i.e., LiAlSCl$_2$×1.7 SO$_2$.

If the quantity of SO$_2$ removed last in the example above is added again, an equilibrium pressure of 2.5 bar sets in again and the solid ionic conductor again has the formula LiAlSCl$_2$×2.1 SO$_2$. An increase of the temperature without changing the SO$_2$ quantity leads to an increase of the SO$_2$ pressure and a decrease in the sulfur dioxide value, LiAlSCl$_2$×1.8 SO$_2$ at approximately 45° C. and a pressure of 3.5 bar, and at 100° C., a pressure of 4.2 bar and a LiAlSCl$_2$×1.5 SO$_2$.

The internal pressure of a battery cell or battery which is free of liquid electrolyte solution can therefore be set via the sulfur dioxide value q, i.e., the corresponding addition or removal of gaseous sulfur dioxide. The ionic internal resistance can also be varied accordingly. The sulfur dioxide value q is preferably set so low that only the solid ionic conductor and gaseous sulfur dioxide are present in the operating temperature range of the battery. Depending on the internal resistance requirement, the sulfur dioxide value q should be as low as possible in order to keep the internal pressure of the battery cell or battery as low as possible. The SO$_2$ value q is preferably set so low that, at least in the operating temperature range and ideally in the entire temperature range of the battery cell, for example, even when the cell is merely stored, no liquid sulfur dioxide, but only gaseous SO$_2$, i.e., free SO$_2$, and the solid ionic conductor are present in the battery.

It thus follows that the sulfur dioxide value q of LiAlSCl$_2$×q SO$_2$, which, according to the above estimate from measurements, is less than or equal to 100, preferably less than 50, more preferably less than 10, more preferably less than 5, particularly preferably less than 2. At room temperature with a value q=1.5 in the battery cell, the SO$_2$ pressure should be less than 1 bar, i.e., excess pressure should no longer be present.

The solid ionic conductor reacts with elemental oxygen. Molecular oxygen oxidizes the sulfur in lithium thiodichloroaluminate from oxidation level −2 to elemental sulfur:

$$2LiAlSCl_2+O_2 \Rightarrow LiAlO_2+LiAlCl_4+2S \quad \text{(Eq. III)}$$

If sufficient oxygen is present, the highly-dispersed sulfur can also be further oxidized to sulfur dioxide.

The solid ionic conductor also reacts with O$^{2-}$ anions or O$^{2-}$-containing substances, hereinafter called O$^{2-}$ ions. In this case, the tetrachloroaluminations, if and as long as they are present, are converted first, and subsequently the solid ionic conductor is converted first.

Numerous oxygen-containing compounds come into consideration as sources for O$^{2-}$ ions in the battery cell. Such sources for O$^{2-}$ ions can be, for example, direct oxides, such as lithium oxide Li$_2$O, or hydroxides, but also water. O$^{2-}$ ions can also be generated, e.g., reductively, e.g., during the first charge by reducing the graphite, on the surface of which there are, for example, hydroxyl groups or carbonylic oxygen groups.

For thermodynamic reasons, the O$^{2-}$ ions initially react with the tetrachloroaluminations to form oxodichloroaluminates, which, via reaction (Eq. II) with the lithium aluminate and the lithium tetrachloroaluminate, are in equilibrium.

In one embodiment, it is advantageous to add hydroxide ions to a battery cell with the solid ionic conductor. This can be achieved, e.g., in that hydroxide ions are added on the surface of the negative graphite electrode, for example, by adding and mixing graphite with finely powdered lithium hydroxide during the production of the electrode. The finely powdered lithium hydroxide is added to the graphite in such a quantity that, e.g., the quantity of the hydroxyl groups present on the graphite, which act as a source of hydroxide ions by reducing the carbon during the first charge, is exceeded by a significant factor. By appropriately dimensioning the added quantity of LiAlCl$_4$ or AlCl$_3$, taking into account the (Eq. II), all the hydroxides or hydroxyl groups present are then reliably converted in the subsequent step when filling a battery cell with a solid ionic conductor, as described below.

The hydrogen atoms of the hydroxides or hydroxyl groups can then be removed from the battery cell. For this purpose, a higher quantity of sulfur dioxide can be added to the battery cell, particularly before or when the battery cell or battery is filled with solid ionic conductors. This excess sulfur dioxide is then preferably removed after the battery has been charged for the first time because during the first charge, the protons formed from the hydroxide ions or hydroxyl groups are reduced to hydrogen. Subsequently, they are removed from the battery cell, which is cooled down, e.g., to −30° C., with the excess sulfur dioxide. In this way, hydrogen atoms can be removed from their compounds as molecular hydrogen from the battery or battery cell, so that, ideally, no more hydroxides or hydroxyl groups are contained in the finished battery cell.

Only when practically all tetrachloroaluminate ions according to Eq. II are used up, the conversion of the solid, sulfur dioxide-containing lithium thiodichloroaluminate with the O$^{2-}$ ions into lithium sulfide, lithium aluminate and lithium chloride starts with the total gross formula:

$$LiAlSCl_2 \times qSO_2+2Li_2O \Rightarrow LiAlO_2+Li_2S+2LiCl+qSO_2 \quad \text{(Eq. IV)}$$

Products which are only sparingly soluble in sulfur dioxide are thus formed. A further reaction of the lithium sulfide no longer takes place because of the lack of tetrachloroaluminates.

In particular, an embodiment is preferred, in which the battery cell, at least after all O$^{2-}$ ions have been used up, is free of substances with the stoichiometric formula KAX$_4$, particularly free of LiAlCl$_4$, wherein the abbreviating letters K, A, and X once again indicate elements according to the groups of elements described above. It is preferred that the battery, at least after all $O^{2-}$ ions have been used up, is free from all substances that meet the stoichiometric formula $KAX_4$ in any combination of elements that are used and indicated by the abbreviating letters described above. Alternatively, it is preferred that the battery, at least after all $O^{2-}$ ions have been used up, is at least free of the substance with the stoichiometric formula $KAX_4$, which is obtained by putting in those elements which have been selected for the sulfur dioxide-containing solid ionic conductor.

The solid ionic conductor can also contain different additional solids. These solids can be impurities. Surprisingly, however, it has been shown, e.g., in the case of the batteries described above with more than 50,000 full charge and discharge cycles, that the incorporation of formed solids, such as lithium aluminate or lithium chloride, into the solid ionic conductor containing sulfur dioxide does not unduly impair the function of the battery. After complete conversion of the lithium tetrachloroaluminate introduced with the liquid electrolyte solution according to (Eq. I), the sulfur dioxide ratio has increased from $LiAlCl_4 \times 6\ SO_2$ with 6 $SO_2$ per lithium tetrachloroaluminate to 11 $SO_2$ per lithium thiodichloroaluminate (consumption of one $SO_2$ per formula conversion). For each formed lithium thiodichloroaluminate containing sulfur dioxide, for example, $LiAlSCl_2 \times 4\ SO_2$, 6 insoluble lithium chlorides and 1 insoluble lithium aluminate would have been formed. The 7 remaining $SO_2$ would be in the gas and in the liquid phase. Since the internal resistance of the battery changes during the reaction according to (Eq. I) did practically not increase, it was possible to charge and discharge the battery half-hourly over the entire cycle duration.

In addition to/instead of lithium chloride or lithium aluminate, the solid ionic conductor can also contain further additional solids, such as aluminum oxide or ionic additives. However, compounds that release aluminum chloride by autodissociation or chemical reaction and thus attack the lithium dithionite layer must be excluded. In particular, the solid ionic conductor should be free of substances with the stoichiometric formula $KAX_4$, wherein K, A, and X are as previously defined, and X can also be an X'.

Producing the pure solid ionic conductor and filling the battery cell with the pure solid ionic conductor can be accomplished in a variety of ways. As described in WO2017/178543 A1, the lithium thiodichloroaluminate can be prepared from the reaction of lithium sulfide with aluminum chloride, see equation V below, or with tetrachloroaluminations, in each case in sulfur dioxide as solvent, see equation VI below. The lithium chloride to be precipitated in both reactions is, e.g., filtered off.

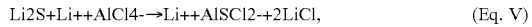

Li2S+Li++AlCl4-→Li++AlSCl2-+2LiCl, (Eq. V)

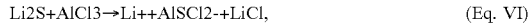

Li2S+AlCl3→Li++AlSCl2-+LiCl, (Eq. VI)

Due to the solubility of the lithium thiodichloroaluminate of approximately 0.4 mol per liter of liquid sulfur dioxide at room temperature, the pores/hollow spaces in the battery cell can be filled by filling the battery cell with a saturated solution and subsequently partially removing the sulfur dioxide and resulting precipitations of the pure solid ionic conductor. This process may have to be repeated several times. Since the solubility of lithium thiodichloroaluminate in liquid sulfur dioxide increases with increasing temperature, filling at an elevated temperature and correspondingly increased pressure can also be advantageous.

When filling a battery, in the housing of which one or more negative or positive electrodes are arranged, for example, in the form of a stack, it must be ensured that the electrodes are not in electrical contact with one another, i.e., the electrodes must not touch, before the filling process. This can be achieved by placing a porous insulator or a porous separator between two adjacent electrodes, which keeps two adjacent electrodes at a distance when filling the battery with liquid electrolyte. Since the pores of the insulator or separator are also filled when the battery is filled with the liquid, i.e., dissolved, solid ionic conductor, and the solid ionic conductor then also precipitates in those locations, the ion flow between the electrodes is made possible. Glass fiber nonwovens, fine or coarse porous ceramic substances are preferably suitable as insulators or separators. A layer of finely ground inert inorganic substances, such as aluminum oxide or silicon carbide, or reactive substances such as lithium aluminate, is particularly preferred.

An alternative for producing the solid ionic conductor in sulfur dioxide would be, e.g., the production according to the formula (Eq. V) in the melt of lithium tetrachloroaluminate with filtration of the precipitated lithium chloride and the (partial) filling of the pores/hollow spaces of the battery cell or the battery with the filtered melt. After the melt has cooled, the battery cell or battery is set to the desired value q by gassing with sulfur dioxide.

As an alternative to the above-described production of the solid ionic conductor based on the reaction of lithium sulfide with aluminum chloride ($AlCl_3$) or lithium tetrachloroaluminate, the solid ionic conductor can also be produced from a reaction of lithium chloride and aluminum thiochloride (AlSCl). Further alternatively, the substance of the solid ionic conductor can also be produced using other methods. For example, U.S. Pat. No. 4,362,794 describes two ways of producing the substance of the solid ionic conductor, using different starting substances.

According to the two methods described above, it is also possible to only fill individual elements of a battery cell, e.g., only the negative electrode or only the positive electrode or a hollow space located between the two electrodes, with the pure solid ionic conductor.

Basically, there are a multiplicity of different options for introducing the solid ionic conductor into the battery cell. In the following, different ways a)-d) shall be described by way of example as to how the solid ionic conductor containing sulfur dioxide can be introduced or generated in the battery cell or in one of the two electrodes.

a) During the production of the electrodes, a corresponding quantity of finely ground lithium sulfide is preferably introduced in a highly-dispersed manner into the negative or positive electrode or both electrodes. For this purpose, the particle diameter of the lithium sulfide should preferably be less than $\frac{1}{10}$ of the particle diameter of the respective active mass. After installing the battery cell or cells in the battery, the battery is filled with a liquid electrolyte made of $LiAlCl_4$ and sulfur dioxide, wherein the quantity of lithium tetrachloroaluminate is dimensioned at least such that it is sufficient for the conversion with $Li_2S$ and the consumption by the $O^{2-}$ ions described above, and the quantity of sulfur dioxide is dimensioned at least such that, after a complete reaction according to (Eq. V), the desired value q is achieved. As a result, a liquid electrolyte is preferably no longer present.

A higher quantity of sulfur dioxide can be removed before or after the first charge. The latter is particularly useful if, e.g., hydrogen is generated in the battery from the hydroxyl groups on the graphite or generally from traces of water when the battery is first charged, which can be, for the most part, removed from the battery cell, cooled down, e.g., to −30° C., with the excess sulfur dioxide.

After filling the battery cell with the liquid electrolyte solution, the battery cell is heated to approximately 30 to 40° C., so that the reaction according to (Eq. V) takes place within minutes or hours, and the solid lithium thiodichloroaluminate containing sulfur dioxide is precipitated as the solid ionic conductor.

If only one type of electrode (e.g. the negative electrodes) is filled with lithium sulfide, the quantity of lithium sulfide and sulfur dioxide can be dimensioned such that practically all pores of both types of electrodes are filled with the solid, sulfur dioxide-containing lithium thiodichloroaluminate via the solubility of the lithium thiodichloroaluminate in free liquid sulfur dioxide. Depending on the length of the diffusion paths, this process can take between hours and several days. Because of the higher solubility at higher temperatures, this process is preferably carried out at 40° C. or higher temperatures.

b) A finely powdered mixture of lithium sulfide with lithium chloride plus equimolar aluminum chloride, which are precursors of lithium tetrachloroaluminate, i.e., the conducting salt of the liquid electrolyte, or lithium tetrachloroaluminate (stoichiometric quantities corresponding to a)), is preferably also pasted into one or both of the electrodes of a battery cell during the production of the electrodes. The battery cell is then filled with an appropriate quantity of liquid sulfur dioxide and further processed in accordance with a).

c) In the reaction of lithium sulfide and aluminum chloride according to (Eq. VI) in the battery cell or one or both electrodes, the stoichiometry according to a) is also observed. The finely powdered mixture of lithium sulfide and aluminum chloride is introduced into one or both types of electrodes. The battery cell is then filled with liquid sulfur dioxide and further processed analogously to a).

d) In a battery cell, in which one electrode type contains finely powdered lithium sulfide, aluminum chloride is applied to the pores of the other electrode type, or if both electrode types contain finely powdered lithium sulfide, a large quantity of fine aluminum chloride powder in accordance with c) is introduced, e.g., into other hollow spaces in the battery. The battery cell is filled with liquid sulfur dioxide and processed analogously to c).

The solid ionic conductor preferably also serves as an insulator or separator between the negative and the positive electrode. The electronic separation between the positive and negative electrodes in a battery cell or between the two types of electrodes within a battery cell is preferably carried out by a thin, electronically non-conductive spacer, which consists of the solid ionic conductor, or the solid ionic conductor with solids, or contains the solid ionic conductor.

In the event that the two types of electrodes are separated electronically in the battery cell by coarse or fine porous ceramic layers, thin ceramic or glass fabric, thin filter nonwovens or the like, the methods described for producing and filling the pure solid ionic conductor or the methods described in examples a) to d) for introducing the solid ionic conductor can be used. On the other hand, the quantities of solid ionic conductor produced can be dimensioned according to the above methods and examples such that the pores or volumes of the insulators or separators are filled.

According to examples a) to d), finely powdered lithium sulfide or mixtures thereof are preferably applied as a thin layer directly to one or both types of electrodes. The sulfur dioxide-containing solid ionic conductor of the lithium thiodichloroaluminate is then formed accordingly during filling by a reaction with the liquid electrolyte solution, as described above in a) to d).

For forming the electronically separating insulator or separator layer, a small quantity of binder, e.g., 4% w/w, is applied to the powders of lithium sulfide or, as described above in a) to d), before their application to one or both types of electrodes in order to increase the mechanical stability during assembly of the battery. For this purpose, for example, THV (terpolymer made of TFE (tetrafluoroethylene), HFP (hexafluoropropylene) and VDF (vinylidene fluoride)) dissolved in acetone, in which the finely powdered lithium sulfide or mixtures thereof are suspended, is suitable. After applying the mixture to an electrode and subsequent vaporization of the acetone, a mechanically stable layer forms from the applied mixture.

In an alternative embodiment, the reactants of the options mentioned above in a) to d), i.e., finely ground lithium powder or with an increased quantity of binder, can be brought together so that a thin layer of the mixture forms a self-supporting film after curing. Such a film can be arranged as an insulator or separator layer between adjacent electrodes during the production of the battery cells, so that an electrical contact between them is prevented.

When the liquid electrolyte is poured into the battery cell, the solid ionic conductor forms during the reaction of the lithium tetrachloroaluminate of the electrolyte with the finely ground lithium sulfide or with the finely powdered mixture of lithium sulfide with lithium chloride and equimolar aluminum chloride, or with the finely powdered mixture of lithium sulfide and aluminum chloride, which were introduced into the electrodes as described above under a) to d). The solid ionic conductor has the property of an insulator or a separator. In one embodiment, the battery cell thus has an insulator or separator layer, which was produced by the reaction of lithium sulfide with the liquid electrolyte on or directly on an electrode.

In an alternative embodiment, a battery cell can also have another suitable separator, for example, a glass fiber filter, which is commercially available under the name Pall and with a thickness of 0.25 mm.

One advantage of the solid ionic conductor is that—in contrast to the organic electrolyte solutions of the lithium-ion cells commonly used in practice—it is non-flammable. The known safety risks of lithium-ion cells are caused particularly by their organic electrolyte solution. When a lithium-ion cell catches fire or even explodes, the organic solvent of the electrolyte solution forms the combustible material. A battery according to the invention, which contains the solid ionic conductor, is preferably essentially free of organic materials, wherein "essentially" refers to the fact that the quantity of possibly present organic materials is so small that they do not pose any safety risk.

The solid ionic conductor according to the invention has the sulfur dioxide in the above described formulas $K(ASX_2)_p \times q\ SO_2$ or $K(ASXX')_p \times q\ SO_2$. In this case, $SO_2$ can be used in the purest form possible, i.e., with the smallest possible quantities of impurities.

If the battery cell still contains a small excess quantity of $KAX_4$ after the completion of the battery, it will be used up according to the self-discharge reaction described above.

As soon as the substance $KAX_4$, particularly $LiAlCl_4$, at least after consumption of all $O^{2-}$ ions, is no longer present in the battery cell, a self-discharge according to the equations described above, or an analogous equation, does surprisingly not take place if the abbreviating letters K, A, and X do not represent lithium or aluminum or chlorine. Therefore, there is no consumption of lithium ions or charge quantity and no sparingly soluble or precipitating salts are formed.

Consequently, it is also sufficient for the long-term operation of the battery cell that it is initially only filled with a significantly reduced quantity of sulfur dioxide-containing solid ionic conductor when compared to conventional battery cells filled with liquid $SO_2$-containing electrolytes. In comparison to conventional battery cells filled with liquid $SO_2$-containing electrolytes, the quantity of sulfur dioxide-containing solid ionic conductors to be introduced during the production of the battery can be reduced to approximately one third, so that the battery has a higher energy density.

With the new electrolyte, a reaction according to the equation described above (Eq. I) does not take place. As a result, the additional introduction of a charge quantity or a quantity of lithium ions for the compensation of the self-discharge according to equation (Eq. I) can advantageously be omitted. As a result, the capacities of the electrodes can be dimensioned more appropriately. The quantity of the sulfur dioxide-containing solid ionic conductor involved in the charging and discharging processes is thus almost completely retained over the entire lifespan of the battery cell.

A reduction in the originally liquid quantity of electrolyte and the replacement of a liquid electrolyte by the sulfur dioxide-containing solid ionic conductor can be achieved particularly in the preferred embodiment, in which the positive electrode has a porosity which is less than 25%, less than 20%, less than 15%, and, alternatively, particularly less than 12%. Alternatively or additionally, it is preferred in a further embodiment that the negative electrode has a porosity that is less than 25%, less than 20%, less than 15% and, alternatively, particularly less than 12%.

A corresponding reduction in the porosity of an electrode can be achieved particularly in that, to the respective electrode, which is preferably formed with particles with a diameter R, particles of the same material but with a smaller diameter, particularly R/3, are added proportionately. This causes the smaller particles to be placed in gaps between the larger particles. In addition to the lower porosity, such electrodes typically have a higher mechanical stability.

The specific energy and the energy density of the battery can be increased from 65 Wh/kg or 200 Wh/l of a conventional precycled battery to over 155 Wh/kg or over 470 Wh/l by using the solid ionic conductor and reducing the porosity from, e.g., 30% to 12%. The nominal capacity for a prismatic battery with the outer dimensions of 130 mm×130 mm×24.5 mm can thus increase, e.g., from about 22 Ah of a conventional precycled battery to over 61 Ah.

The battery housing is generally designed such that it cannot be penetrated by water vapor or oxygen. Metal housings are preferably suitable for batteries according to the invention which have an increased internal pressure. If the sulfur dioxide pressure for the operating temperature range can be set such that there is hardly any increased internal pressure, conventional pouch cells are also suitable.

The decrease in capacity over the number of cycles is greatly reduced by using the sulfur dioxide-containing solid ionic conductor according to the invention. A self-discharge is suppressed such that it is practically no longer measurable.

In the literature (Ohta, N.; Takada, K.; Zhang, L.; Ma, R.; Osada, M.; T. Sasaki, T.: Adv. Mater., 18 (2006) 2226), a high lithium ion contact resistance at the boundary layer between an electrode and the solid ionic conductor has been described as a fundamental problem when using solid ionic conductors. In the above case, the high resistance at the boundary layer was attributed to a so-called space-charge region which forms along the boundary layer. In it, a lithium ion depletion occurs on the side of the solid ionic conductor in order to maintain the equilibrium of the chemical potential at the boundary layer. It has been proven that such an unfavorable space-charge region can be reduced or avoided by introducing a buffer layer.

According to the inventor's understanding, the lithium dithionite layer functions as a buffer layer in battery cells with a solid ionic conductor containing sulfur dioxide. It is formed, for example, on the negative electrode at potentials below 3V vs. $Li/Li^+$ through the reduction of sulfur dioxide when the cell is first charged.

It is also possible to at least partially apply known buffer layers, such as $LiNbO_3$, to the surface of the electrodes. However, as described in WO2015/067795, a stable lithium dithionite layer is preferably also generated particularly on the positive electrode.

It is therefore advantageous that the solid ionic conductor according to the invention is essentially free of substances which attack, dissolve or otherwise break down or damage the desired lithium dithionite layer. The term "essentially free" indicates that the substance is present at most in such a small quantity that it does not break down/damage the lithium dithionite layer. Examples of such substances, which are not supposed to be present, are oxidizing agents, such as chlorine, thionyl chloride, and sulfuryl chloride.

In particular, thionyl chloride causes the formation of a passivating and gradually increasing cover layer of lithium chloride on the negative electrode, which, in any case, counteracts the desired formation of the lithium dithionite layer.

An electrochemical battery cell with the solid ionic conductor described above and with the pores of the battery cell filled from the negative electrode can be produced as follows. A suitable positive electrode can be produced in that 94% w/w of lithium iron phosphate, which is commercially available under the trade name TMAX-LFP-1, with 4% of a binder THV, which is commercially available, for example, from 3M and under the trade name Dyneon THV 221 AZ, and 2% conductivity improver, sold by TIMCAL under the trade name SUPER P® are stirred in acetone to form a paste. This paste is introduced into a nickel foam, which is available, for example, from Duranice Applied Materials. After vaporization of the solvent, the nickel foam is pressed with the paste from an original thickness of 1.6 mm to 0.6 mm and subsequently thermally treated at 120° C.

In one embodiment, a suitable negative electrode can be produced in that 15% w/w of finely ground lithium sulfide, i.e., with a grain diameter $D_{50}$ of less than 5 μm, is stirred in acetone to form a paste with 85% w/w of graphite, which is available from TIMCAL under the trade name SLP50, and pasted into a nickel foam, which is commercially available from Duranice Applied Materials. After vaporization of the acetone, the nickel foam filled with lithium sulfide and graphite is pressed from an original thickness of 0.8 mm to 0.4 mm.

In one embodiment, 9 negative and 8 positive electrodes can subsequently be placed in an alternating arrangement in a battery housing, for example, a stainless steel housing, wherein one separator each is arranged between a negative and the adjacent positive electrode. The electrodes arranged on the outside of an electrode stack are preferably negative electrodes. The battery housing can subsequently be closed with a lid, wherein the lid has a filling tube and the lid is firmly connected to the rest of the housing in a gas-tight manner, for example, by welding in the case of a stainless steel housing. At a temperature of approximately −20° C., the housing can then be filled with an electrolyte LiAlCl$_4$×8 SO$_2$, wherein said electrolyte is (still) liquid. For this purpose, the quantity of the poured in electrolyte is dimensioned such that 80% w/w, preferably more than 80% w/w, and particularly 100% of the lithium tetrachloroaluminate introduced is sufficient for the complete conversion of the lithium sulfide.

The filled battery is then stored for a longer period of time, for example, for a duration of 7 days and at a temperature of 40° C. During this period, the introduced liquid electrolyte is converted into the solid ionic conductor by reaction with the lithium sulfide, wherein a small portion of the liquid electrolyte remains in the liquid state, which in this embodiment is typically a maximum of 20% w/w of the solid ionic conductor. Said remaining liquid electrolyte is subsequently drained from the battery turned upside-down and via the filling tube of the lid.

Prior to the charging process, i.e., in the initial state, a completed battery cell essentially has only the solid ionic conductor as the electrolyte and in one embodiment contains less than 10% w/w of the solid ionic conductor as liquid electrolyte, in a preferred embodiment contains less than 5% w/w of the solid ionic conductor as liquid electrolyte, and in a particularly preferred embodiment contains less than 1% w/w of the solid ionic conductor as liquid electrolyte.

The invention claimed is:

1. Solid ionic conductor for a rechargeable non-aqueous electrochemical battery cell having the stoichiometric formula K(ASXX')$_p$×q SO$_2$, wherein K represents a cation from the group of the alkali metals with p=1, of the alkaline-earth metals with p=2 or of the zinc group with p=2, A represents an element from the third main group, S represents sulfur, or selenium, or tellurium, X and X' represents a halogen and SO$_2$ represents sulfur dioxide, wherein the numerical value q is greater than 0 and less than or equal to 100.

2. Solid ionic conductor according to claim 1, wherein the sulfur dioxide value q is less than 50, preferably less than 10, further preferably less than 5, and particularly preferably less than 2.

3. Solid ionic conductor according to claim 1, wherein X and X' represent the same halogen.

4. Solid ionic conductor according to claim 1, wherein it is free of substances with the stoichiometric formula KAX$_4$, wherein K, A, and X are defined as in claim 1.

5. Rechargeable non-aqueous electrochemical battery cell, comprising a negative and a positive electrode and a solid ionic conductor according to claim 1.

6. Rechargeable non-aqueous electrochemical battery cell according to claim 5, wherein the solid ionic conductor is not contained in and/or on the negative electrode.

7. Rechargeable non-aqueous electrochemical battery cell according to claim 5, wherein the solid ionic conductor is not contained in and/or on the positive electrode.

8. Rechargeable non-aqueous electrochemical battery cell according to claim 5, wherein it initially contains less than 10% w/w, preferably less than 5% w/w, and particularly preferably less than 1% w/w of the solid ionic conductor as liquid electrolyte.

9. Rechargeable non-aqueous electrochemical battery cell according to claim 5, wherein it comprises free SO$_2$ only in the gaseous state.

10. Rechargeable non-aqueous electrochemical battery cell according to claim 5, wherein the battery cell contains the solid ionic conductor in an insulator or separator and/or in hollow spaces located between the positive and the negative electrode.

11. Rechargeable non-aqueous electrochemical battery cell according to claim 5, wherein the positive or the negative electrode has a porosity that is less than 25%, less than 20%, less than 15%, particularly less than 12%.

12. Rechargeable non-aqueous electrochemical battery comprising a housing and at least one battery cell according to claim 5.

13. Method for producing a rechargeable non-aqueous battery with a solid ionic conductor according to claim 1, comprising a housing and at least one negative electrode and one positive electrode arranged in the housing, and wherein lithium sulfide is introduced into the housing, preferably on the negative or positive electrode comprising filling the housing with a liquid electrolyte.

14. Method according to claim 13, wherein the liquid electrolyte contains a solvate of lithium tetrachloroaluminate and sulfur dioxide.

15. Method according claim 13, comprising the steps
mixing the lithium sulfide with a binder, and
applying a layer of the mixture to at least one electrode, and
introducing the electrode with the layer into the housing of the battery.

16. Method for producing a rechargeable non-aqueous battery having a solid ionic conductor according to claim 1, comprising a housing and at least one negative electrode and one positive electrode arranged in the housing, and wherein lithium sulfide and the conducting salt of the liquid electrolyte or precursors thereof or aluminum chloride are introduced in the housing, preferably in or on at least one of the electrodes, comprising filling the housing with liquid sulfur dioxide.

* * * * *